United States Patent [19]

Wollbeck et al.

[11] Patent Number: 4,961,464
[45] Date of Patent: Oct. 9, 1990

[54] MASS AND/OR HEAT EXCHANGER WITH THERMAL EXPANSION RELIEF

[75] Inventors: Rudi Wollbeck, Erlenbach; Thomas Zang, Goldbach, both of Fed. Rep. of Germany

[73] Assignee: Akzo N.V., Netherlands

[21] Appl. No.: 408,267

[22] Filed: Sep. 18, 1989

[30] Foreign Application Priority Data

Sep. 19, 1988 [DE] Fed. Rep. of Germany ....... 3831786

[51] Int. Cl.⁵ .............................................. F28F 7/00
[52] U.S. Cl. ...................................... 165/83; 165/82; 210/321.9
[58] Field of Search .................... 165/81–83; 210/321.9

[56] References Cited

U.S. PATENT DOCUMENTS

| | | | |
|---|---|---|---|
| 1,660,163 | 2/1928 | Heaton | 165/83 |
| 1,733,999 | 10/1929 | Schumarty | 165/83 |
| 2,512,748 | 6/1950 | Lucke | 165/83 |
| 4,265,763 | 5/1981 | Bollinger et al. | 210/323.2 |
| 4,622,143 | 11/1986 | Edwards | 210/321.1 |
| 4,678,573 | 7/1987 | Otstot et al. | 210/321.1 |

FOREIGN PATENT DOCUMENTS

| | | |
|---|---|---|
| 2733280 | 1/1978 | Fed. Rep. of Germany . |
| 2646358 | 4/1978 | Fed. Rep. of Germany . |
| 2950426 | 6/1980 | Fed. Rep. of Germany . |
| 3039307 | 4/1981 | Fed. Rep. of Germany . |
| 2090546 | 7/1982 | United Kingdom . |

*Primary Examiner*—Martin P. Schwadron
*Assistant Examiner*—Allen J. Flanigan
*Attorney, Agent, or Firm*—Oliff & Berridge

[57] ABSTRACT

A mass and/or heat exchanger includes at least one bundle of capillaries, the ends of which are embedded in a casting composition, and a housing in which the capillaries with the casting composition are arranged in such a way that the casting composition represents a liquid-tight isolation between the lumens of the capillaries and the space outside the capillaries. An elastic element which compensates for differences in changes of length of the at least one bundle of capillaries and the housing, is provided between the casting composition and the housing.

11 Claims, 5 Drawing Sheets

MASS AND/OR HEAT EXCHANGER WITH THERMAL EXPANSION RELIEF

TECHNICAL FIELD

The invention relates to mass and/or heat exchangers which contain a multiplicity of capillaries. Capillaries are understood to mean hollow fibers or tubes which, as a rule, have a small lumen (internal diameter) and a small wall thickness, the wall thickness/lumen ratio being given as a measure of the effectiveness of the mass and/or heat exchanger. In the case of capillaries, the ratio of wall thickness S and lumen L is in the range of $$1:5 \leq S/L \leq 1:40$$

preferably $$1:10 \leq S/L \leq 1:30.$$

If capillaries are used only for heat exchange, the walls of the capillaries have only a very slight porosity or none at all, whereas the walls of the capillaries for mass transfer always have pores of a size adapted to the material which is to be transferred.

BACKGROUND

Mass and/or heat exchangers which contain a multiplicity of capillaries are as a rule constructed in such a way that the ends of the capillaries are embedded in a casting composition. The capillaries with the casting composition are arranged in a housing in such a way that the casting composition represents a liquid-tight isolation between the lumen of the capillaries and the space outside the capillaries.

In mass and/or heat exchangers the capillary ends are usually embedded into the housing pipe, surrounding them, in a liquid-tight and pressure-resistant manner by means of a reactive resin or a thermoplastic polymer. These mass and/or heat exchangers are also called modules.

Especially in the case of modules having relatively large housing diameters (diameters of about 50 mm and higher), a capillary bundle firmly cast into the housing frequently causes tearing-off phenomena and leakages. Extreme operating conditions (steam sterilization, temperature fluctuations, differential pressures between the spaces outside and inside the capillaries) and specific membrane properties (shrinkage, extension when wet) build up such high marginal stresses between the capillary casting and the housing that a secure joint, based on the adhesive strength of the casting, is not ensured.

Even clamped flange joints, in which a partially elastic casting material (for example polyurethane) is stressed between two metal flanges, do not solve the problem. Due to the cold-flow behavior of the elastic casting material, such a joint easily leads to leakages, particularly under thermal stress.

SUMMARY OF THE INVENTION

It is an object of the present invention to eliminate the above-noted disadvantages. For this purpose, a module concept is proposed, in which the capillary embedding is carried out separately and the cast capillary bundle can be mounted in the housing by means of mechanical sealing elements (flange/bolt joint, round cord rings). In particular, a mass and/or heat exchanger is made available which shows particularly high effectiveness.

The compensation of the length change of the capillary bundle is effected by an elastic membrane ring, which also takes care of the differential forces arising from the pressure differences between the lumen of the capillaries and the space outside the capillaries. The softness or elasticity of the membrane ring is adjustable within a wide range via the rubber grade and the geometrical design of the membrane ring. A number of elastic materials—similar to the case of round cord rings—is available for selection. The material remains permanently elastic and is preferably vulcanized into two flange ring parts. The membrane ring can, however, also be comprised of other materials, for example of metals.

Moreover, the design allows the capillary bundles to be replaced without problems by another in the case of a membrane defect, or if membrane inserts having different separation properties are desired or become necessary. The module concept is applicable to both mass exchangers and heat exchangers.

BRIEF DESCRIPTION OF THE DRAWINGS

The invention is explained in more detail by reference to the Figures in which.

DETAILED DESCRIPTION OF PREFERRED EMBODIMENTS

Figure 1:
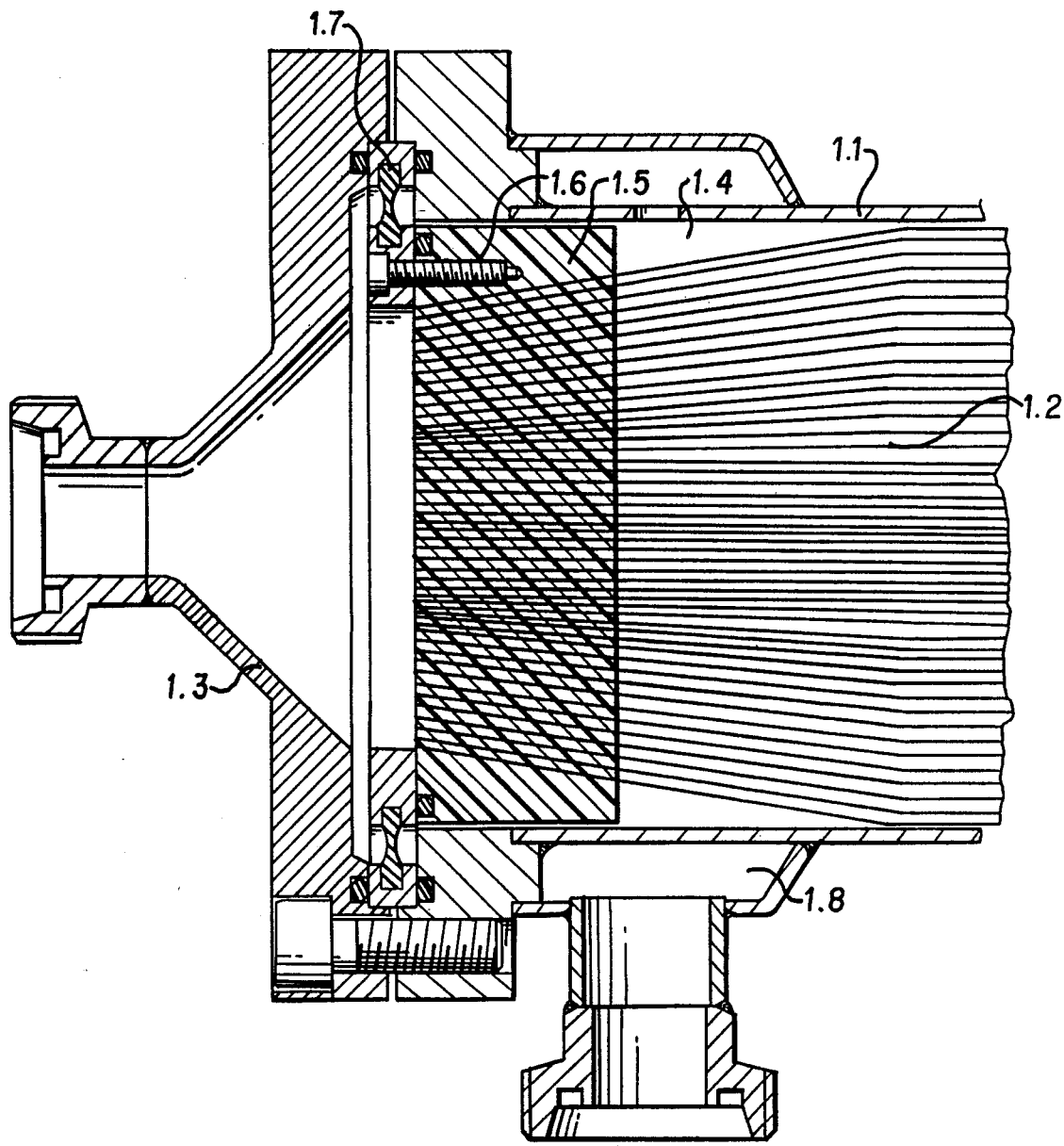
FIG. 1 shows a part of a mass and/or heat exchanger.

For embedding the multiplicity of capillaries 1.2, 2.4, 3.15, reactive casting resins, preferably polyurethanes or epoxide resins, and also thermoplastics can be used as the casting composition 1.5, 2.10, 3.1.

Owing to the elastic element 1.7, 2.12, 3.5, 4.2 provided according to the invention, it becomes possible to make the mass and/or heat exchange, in particular the heat exchange, even more intensive by design measures, because the length difference, which fluctuates more widely due to the increased intensity of the heat exchange, between the capillaries and the housing can now be effectively compensated.

For this purpose, it is proposed according to the invention to provide, in the center of the membrane bundle, a displacement body 2.5, 3.2 which projects beyond the casting composition and effects a forced flow in the outside space of the module from the center, which has no capillaries due to the displacement body, towards the housing (and/or vice versa), passing through the capillaries.

The displacement body 2.5, 3.2 is preferably of tubular shape and has passage openings 2.7, so that the space outside the capillaries 1.4, 2.6 (outside space) of the module can be charged with a fluid or gas via the displacement body. Preferably, the charging initially takes place axially from the outside into the center, and radially after leaving the displacement body.

It is advantageous to take measures directly in the casting composition during the preparation thereof, in order to ensure a good joint between the elastic element 1.7, 2.12, 3.5, 4.2 and the casting composition 1.5, 2.10, 3.1. This can be achieved, for example, by embedding metal particles or plastic particles into the casting composition during the preparation thereof.

In the same way, the threads 1.6, 2.11, 3.4 or the like required for fixing the elastic element to the casting composition can either be worked mechanically into the casting composition or cast in as moldings.

The displacement body also makes it possible to increase the degree of filling of the module in the embedding region of the capillary bundles as compared with the space outside the capillaries.

It is particularly advantageous when all components are made of such materials that the module produced from them is steam-sterilizable.

It is also expedient to surround the capillaries with a perforated protective envelope 2.1, 3.13.

Figure 2:
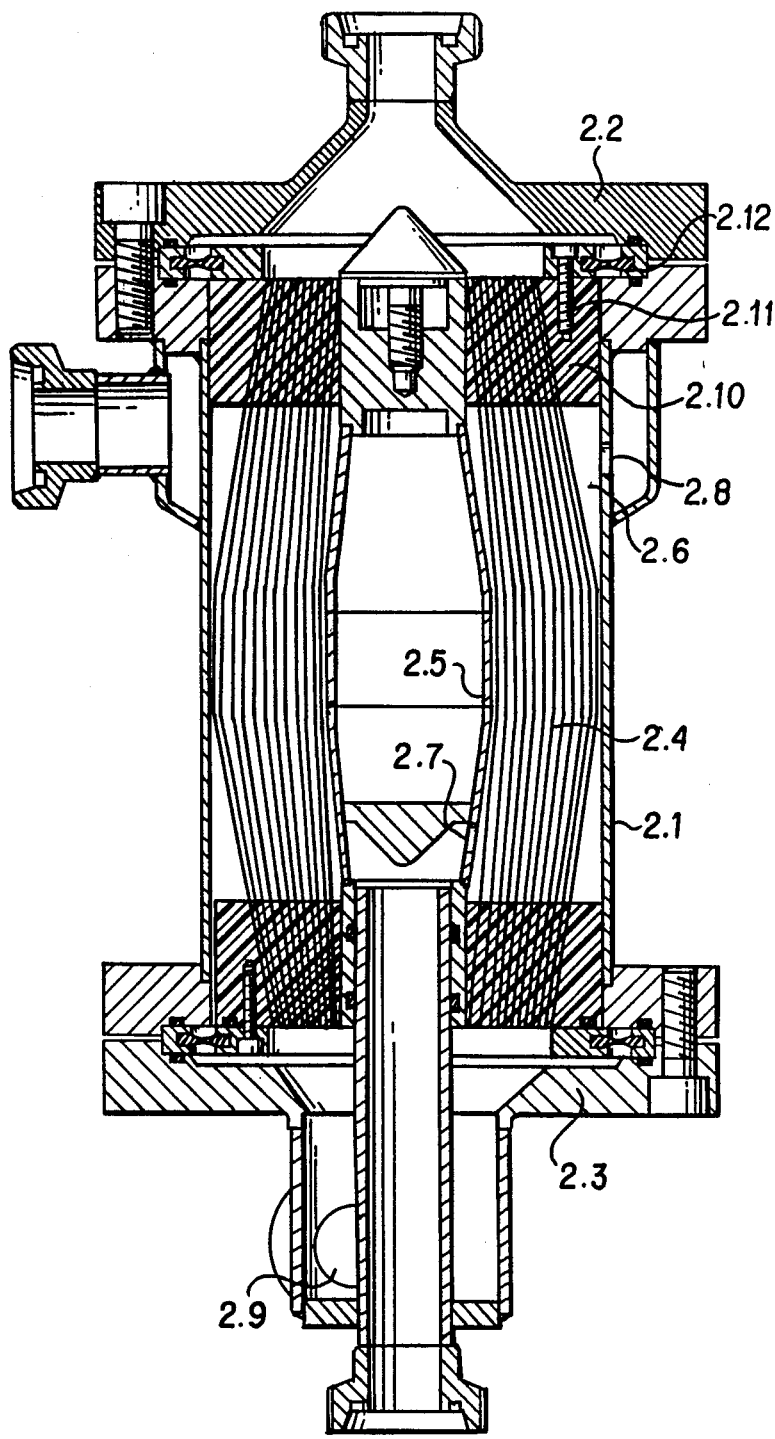
FIG. 2 shows, in a diagrammatic representation, an axial section of a preferred embodiment.
Figure 3:
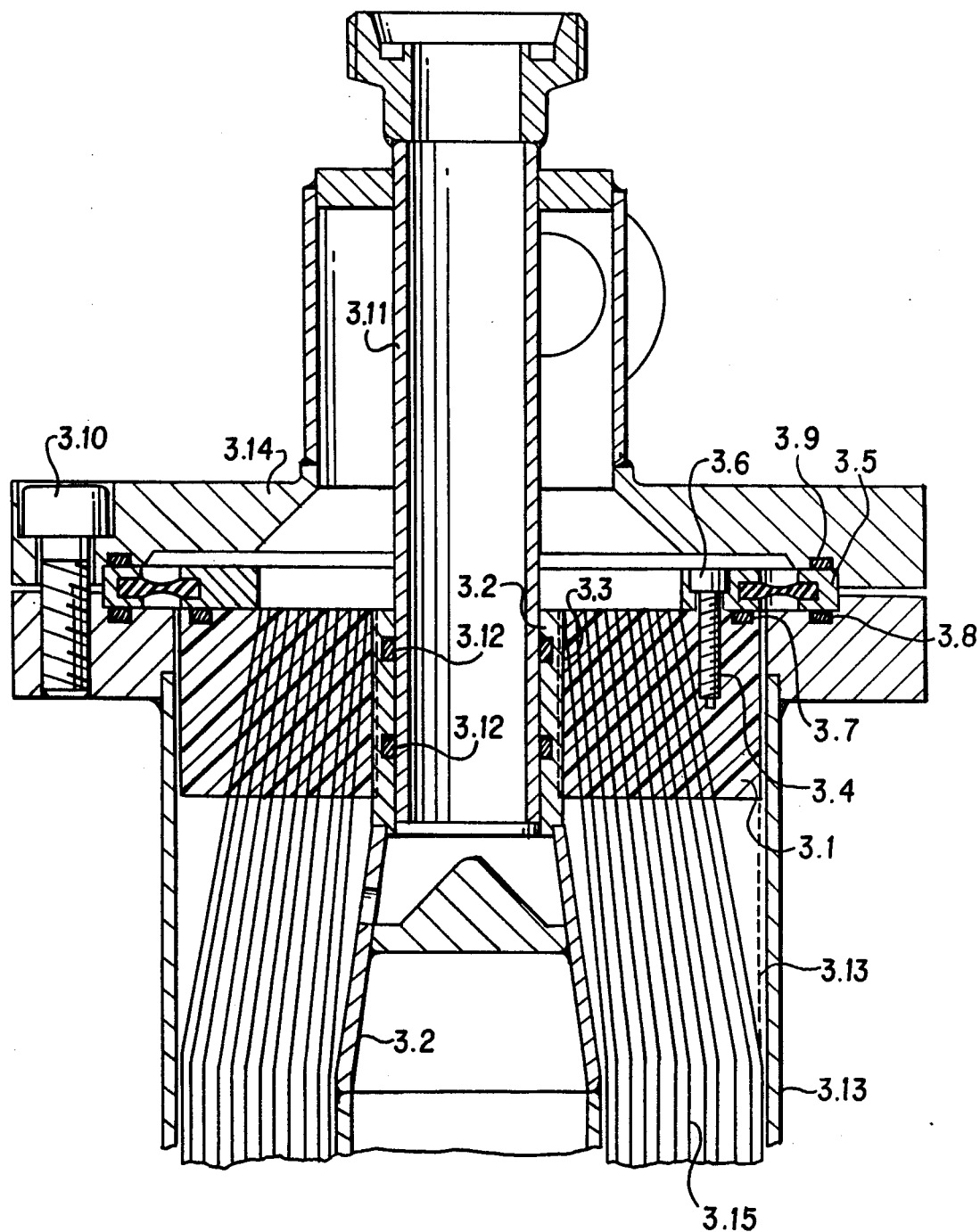
FIG. 3 shows a part from FIG. 2 in detail.

An illustrative example (FIGS. 2 to 3) shows an exchangeable capillary bundle 2.4, 3.15, made from at least one bundle of capillaries, with a centrally arranged displacement body 2.5, 3.2, through which a fluid can be charged to the space outside the capillaries of the module.

Opposite to the perforation openings 2.7 of the displacement body, there are also openings 2.8 in the housing pipe, which lead into an annular collecting channel. This arrangement ensures intensive flow in the space 2.6 outside the capillaries. Thus, the displacement body permits flow in the space outside the capillaries from the center towards the housing, passing through the capillaries.

The ends of the membranes or capillaries are embedded by means of a liquid reactive resin. The pressure-tight and liquid-tight joining of the reactive resin to the displacement body also takes place simultaneously with the embedding of the capillaries.

The required adhesive strength of the reactive resin to the displacement body is achieved by appropriate shaping of the displacement body in the casting region.

Threaded bores 2.11, 3.4 for fixing the elastic ring flange 2.12, 3.5 are made in the casting block 2.10, 3.1 of the embedded capillary ends. The block is screwed pressure-tight and liquid-tight to the casting block by means of stainless steel screws 3.6 and a round cord ring 3.7. The elastic ring flanges 2.12, 3.5 compensate for differences in changes of length of the at least one bundle of capillaries 2.4, 3.15 and the housing 2.1, 3.13.

The external sealing is provided by the round cord rings 3.8 and 3.9, which are clamped pressure-tight via the flange bolts 3.10 between the flange of the housing tube and the connecting flange 2.2, 2.3, 3.14. The connecting flange is provided with a central piece of pipe 3.11, which projects into the centrally arranged displacement body and isolates the space inside the capillaries from that outside the capillaries, sealed by two round cord rings 3.12.

Figure 4:
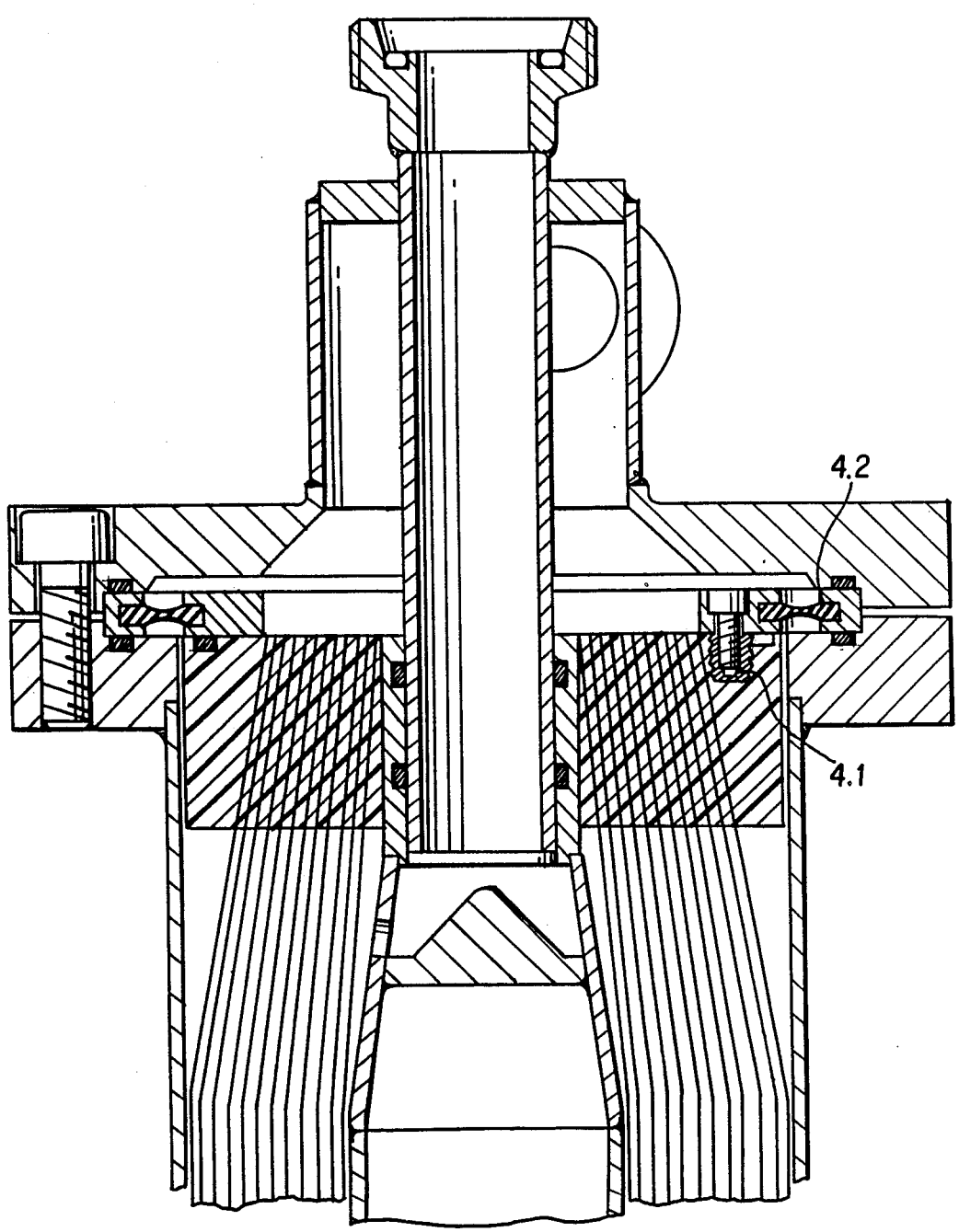
FIG. 4 shows a further variant.

For protection of the capillary bundle, a perforated protective envelope 2.1, 3.13 is fitted between the casting blocks. In the case of high temperature stresses and pressure stresses and special reactive resins, it is advantageous to embed the threaded bores for fixing the elastic ring flange 4.2 in the form of prefabricated threaded elements 4.1 simultaneously with the casting-in of the capillaries (FIG. 4).

Figure 5:
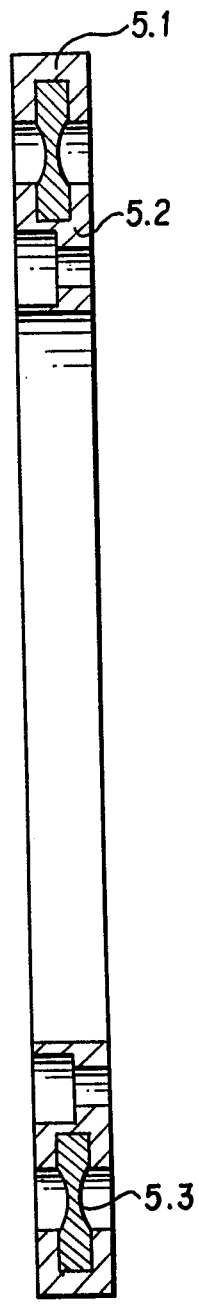
FIG. 5 shows an illustrative example of an elastic ring flange.

FIG. 5 shows an illustrative example of an elastic ring flange. A molding 5.3 is vulcanized in between an outer holder ring 5.1, which is of stainless steel in the illustrative example, and an inner holder ring 5.2. Both the geometrical design of the molding and the material can be adapted to the particular application.

In FIG. 1, the housing pipe 1.1 is of symmetrical structure and has inflow and outflow pockets 1.8 at all the ends. The membrane parcel 1.2 has no displacement body. The elastic mounting and the compensation of the length change by means of the elastic ring flange 1.7 corresponds to that described above. The embodiment of FIG. 1 includes at least one capillary bundle 1.2, a connecting flange 1.3, extra capillary space 1.4, casting block 1.5 and threaded bores 1.6.

For the sake of clarity, identical parts are not marked in all the Figures. The external geometry of the module is determined by the housing pipe and the two connecting flanges. A capillary bundle or membrane bundle is installed in the module housing.

EXAMPLE

For a mass transfer experiment, 43000 cellulose capillary membranes were processed to form a module. The inner transfer area was 8.9 m$^2$ and the outer transfer area was 9.9 m$^2$. The capillary-embedding composition consisted of an epoxide resin mixture. After the membrane insert had been mounted in the module housing, the latter was first checked for tightness of the capillaries and the embedding (integrity test). For doing this, the capillaries were subjected both on the inside and on the outside to a gas pressure of 1 bar for 10 minutes. The pressure drop was here 265 mbar, which proved the module to be tight (Mastreck filter test). The module then passed through 5 steam sterilization cycles, both the space inside the capillaries and the space outside the capillaries being charged in each cycle for 30 minutes with steam saturated at 121° C.

In the subsequent tightness test, the measuring instrument recorded 272 mbar pressure drop after the pressure had been held for 10 minutes. (For this size of module, the pressure drop in a tight module (diffusion) fluctuates between 250 and 300 mbar).

To assess the performance capacity of the module, the mass transport coefficient for a 1M KCl solution through the membrane employed for this module was measured. It was $$K_o = 8.25 \times 10^{-3} \text{ cm/minute.}$$

A laboratory module with 1324 capillaries gave $K_o = 9.2 \times 10^{-3}$ cm/minute under comparable experimental conditions.

When the $K_o$ value of the laboratory module is set at 100, an efficiency of $(8.25 \times 100):9.2 = 89.7\%$ results for a version enlarged by a factor of 32.5.

We claim:

1. A mass and/or heat exchanger, comprising at least one bundle of capillaries having lumens, ends of said capillaries being embedded in a casting composition, and a housing in which the capillaries with the casting composition are arranged such that the casting composition forms a liquid-tight isolation between the lumens of the capillaries and space outside the capillaries within the housing, wherein an elastic ring flange which compensates for differences in changes of length of the bundle of capillaries and the housing, is readily removably provided between the casting composition and the housing, said elastic ring flange including an inner non-elastic ring, an outer non-elastic ring and an elastic ring located between and attached to said inner and outer non-elastic rings, said inner non-elastic ring, outer non-elastic ring and said elastic ring being firmly connected together to form one part, said elastic ring having no bores therethrough and said inner non-elastic ring being readily removably attached to said casting composition.

2. A mass and/or heat exchanger as claimed in claim 1, wherein the elastic element is a ring flange.

3. A mass and/or heat exchanger as claimed in claim 1, wherein a displacement body is provided in a center of the bundle of capillaries, said displacement body projecting beyond the casting composition and permitting flow in the space outside the capillaries from the center towards the housing.

4. A mass and/or heat exchanger as claimed in claim 2, wherein a displacement body is provided in a center of the bundle of capillaries, said displacement body projecting beyond the casting composition and permitting flow in the space outside the capillaries from the center towards the housing.

5. The mass and/or heat exchanger as claimed in claim 1, wherein said elastic ring is vulcanized in between said inner and outer non-elastic rings.

6. The mass and/or heat exchanger as claimed in claim 1, further comprising connecting means for removably connecting said inner non-elastic ring to said casting composition.

7. The mass and/or heat exchanger as claimed in claim 6, wherein said inner non-elastic ring includes bores extending therethrough for receiving said connecting means and said casting composition includes receiving means for receiving said connecting means.

8. The mass and/or heat exchanger as claimed in claim 7, wherein said connecting means is at least one screw.

9. The mass and/or heat exchanger as claimed in claim 7, wherein said receiving means is at least one molding cast into said casting composition and including threads.

10. The mass and/or heat exchanger as claimed in claim 1, wherein said elastic ring is a flattened annular elastic ring having an inner surface and an outer surface, said inner surface having a diameter less than said outer surface and being attached to said inner non-elastic ring, said outer surface being attached to said outer non-elastic ring.

11. The mass and/or heat exchanger as claimed in claim 2, further comprising a tube slidably engaging said casting composition and directing flow to said displacement body.

* * * * *